United States Patent [19]

Huang

[11] Patent Number: 5,338,096
[45] Date of Patent: Aug. 16, 1994

[54] LOCKING DEVICE FOR A FRONT SEAT OF A DOUBLE STROLLER

[75] Inventor: Mien-Cheng Huang, Tainan Hsien, Taiwan

[73] Assignee: Taiwan Charwell Enterprise, Co., Ltd., Tainan Hsien, Taiwan

[21] Appl. No.: 137,933

[22] Filed: Oct. 19, 1993

[51] Int. Cl.⁵ .............................................. B62B 9/10
[52] U.S. Cl. ..................... 297/243; 280/30; 280/47.38; 297/245; 297/440.22; 297/257
[58] Field of Search .......... 297/130, 243, 245, 440.22, 297/257; 280/30, 47.35, 47.38

[56] References Cited

U.S. PATENT DOCUMENTS

| | | | |
|---|---|---|---|
| 3,223,431 | 12/1965 | Gottfried et al. | 297/245 X |
| 3,915,493 | 10/1975 | Brown | 297/440.22 X |
| 3,917,312 | 11/1975 | Rodaway | 297/130 X |
| 4,886,209 | 12/1989 | Yee et al. | 297/245 X |
| 5,184,835 | 2/1993 | Huang | 280/47.38 X |

FOREIGN PATENT DOCUMENTS

| | | | |
|---|---|---|---|
| 753337 | 7/1956 | United Kingdom | 280/47.38 |
| 1014004 | 12/1965 | United Kingdom | 280/47.38 |

*Primary Examiner*—Peter R. Brown
*Attorney, Agent, or Firm*—Morton J. Rosenberg; David I. Klein

[57] ABSTRACT

A locking device for a front seat of a double stroller which is capable of locking the front seat after it is turned around 180 degree from a forward position to a backward position includes two engage posts to engage or disengage from a notch of a locating block and a notch of a hook plate fixed on each of two seat locating rods of a main frame of the double stroller so as to lock or unlock the front seat immovable or movable after it is turned around.

1 Claim, 5 Drawing Sheets

LOCKING DEVICE FOR A FRONT SEAT OF A DOUBLE STROLLER

BACKGROUND OF THE INVENTION

A conventional double stroller shown in FIG. 6 has two seats for two babies to sit at the same time, to decrease work in taking care of babies, having a front seat 10 and a rear seat 20 fixed firmly on a frame 30, but the front seat is stationary, impossible to be turned around to face the rear seat for two babies to play with each other.

SUMMARY OF THE INVENTION

This invention has been devised to offer a double stroller with a front seat capable to be turned around to face a rear seat so that two babies sitting on the two seats may play with each other.

A locking device for a front seat can lock the front seat immovable after it is turned around forward or backward, including a support frame of a front seat, two engage posts fixed sidewise on each of two lower portions of the support frame, a locating block of H-shape having two notches in two parallel ridges for one of the two engaging posts to engage, a hook plate pivotally connected with each of the two seat locating rods and having a notch to engage one of the engaging posts and a sustaining block fixed firmly on a front portion of the seat locating rod behind the locating block. The front seat is capable to be turned around 180° and then can be locked at its place immovable by engagement of the engaging posts with the notches of the locating block and the plate.

BRIEF DESCRIPTION OF DRAWINGS

The invention will be better understood by reference to the accompanying drawings, wherein.

DESCRIPTION OF THE PREFERRED EMBODIMENTS

Figure 1:
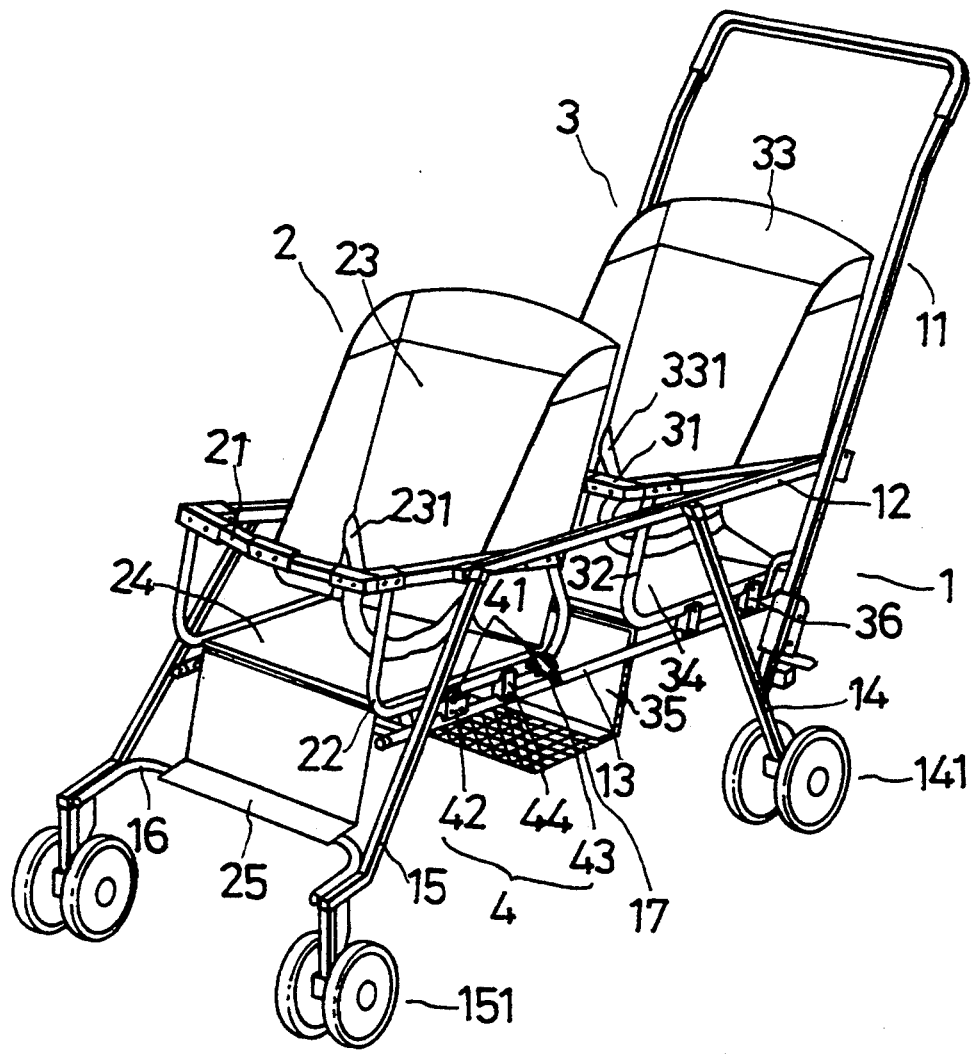
FIG. 1 is a perspective view of a double stroller in the present invention.

A double stroller in which a locking device for a front seat is used in the present invention, as shown in FIG. 1, includes a main frame 1, a front seat 2, a rear seat 3, and a locking device 4 for the front seat.

The main frame 1 includes a handle 11, two horizontal opposite side rods 12, 12 which have rear ends welded with intermediate portions of the handle 11, two horizontal seat locating rods 13, 13 which have rear ends welded with lower portions of the handle 11. Two rear wheel support rods 14 are provided inclinedly between the two horizontal side rods 12, 12 and two rear wheels 141, 141. Two front wheel rods 15, 15 are provided inclinedly between the two horizontal side rods 12, 12 and two front wheels 151, 151. The two lower ends of the handle 11 are firmly fixed with a lower portion of each of the two rear wheel support rods 14, 14. A U-shaped auxiliary rod 16 is provided between two lower ends of the two front wheel rods 15, 15. A wire net frame 17 is provided at a lower position between the two seat locating rods 13, 13.

The front seat 2 and the rear seat 3 are respectively supported by support frames 22, 32, which each have protecting front rods 21, 31 fixed firmly with upper ends of the support frames 22, 32. The front seat 2 and the rear seat 3 have respectively backrests 23, 33 affixed with safety belts 231, 331, and footrests 25, 35. And the rear seat 3 is kept stationary in place by means of two connecting blocks 36 fixed between the locating rods 13 and the support frame 32.

The above mentioned structure of the double stroller is a conventional one, not the feature this invention aims to include. The structural feature of the present invention is the locking device 4 for the front seat 2, wherein two engaging posts 41, 41 are provided sidewise and spaced apart on both ends of a lower portion of the support frame 22, and a locating block 42, a hook plate 43 and a sustaining block 44 are provided spaced apart on each of the two locating rods 13, 13.

Figure 2:
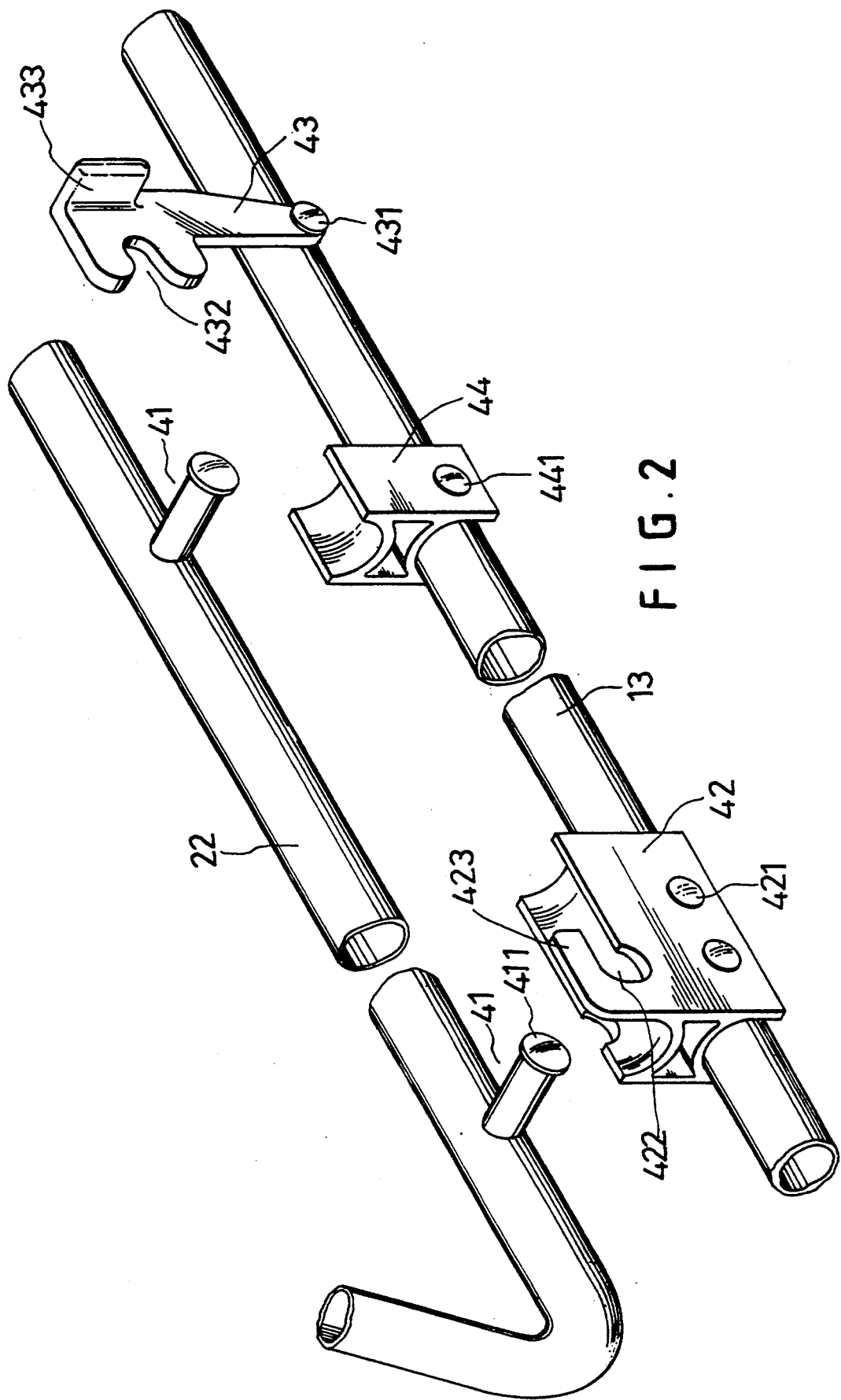
FIG. 2 is an exploded perspective view of a locking device for a front seat of a double stroller in the present invention.

In the locking device 4 shown in FIG. 2, the support frame 22 of the front seat 2 is not firmly connected with the two seat locating rods 13, 13 of the main frame 1, so the front seat 2 is free to be turned around for 180° to selectably face forward or backward toward the rear seat 3, and capable to be locked at either position by the locking device 4. Each engaging post 41 welded on the support frame 22 has a larger diameter head 411 than its body. Each locating block 42 is almost H-shaped, firmly fixed on each of the two locating rods 13, 13 with two rivets 421, 421, having a notch 422 in each of two upper flat parallel ridges for one of the two engaging posts 41 to engage with, an upper L-shaped projection 423 on the notch 422 in the outer ridge to keep one of the two engaging posts 41 from slipping off the notch 422. The hook plate 43 is pivotally connected with a rear portion of each of the two locating rods 13, 13 with a rivet 431, having a notch 432 to hook one of the two engaging posts 41, 41 and a sidewise flat projection 433 for manually moving the hooking plate 43. The sustaining block 44 is firmly fixed with a rivet 441 on a front portion of each of the two locating rods 13, 13 behind the locating block 42 and in front of the hooking plate 43, being almost H-shaped as the locating block 42 and having an upper recessed semicircular surface to receive and sustain the lower portion of the support frame 22.

Figure 3:
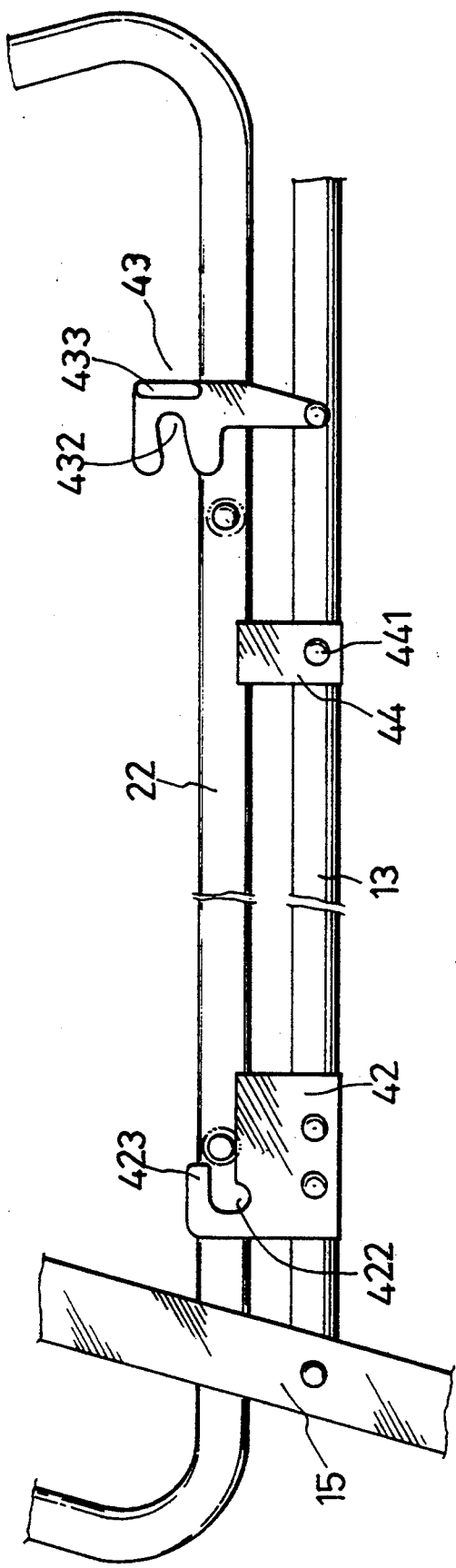
FIG. 3 is a side view of a front seat being moved to engage a seat locating rod in the double stroller in the present invention.

FIG. 3 shows the front seat 2 has been turned around for 180° to face the rear seat 3, with the two lower portions of the support frame 22 being sustained on the locating block 42 and the sustaining block 44, but not yet locked in its place by engagement of the engaging posts 41, 41 with the locating block 42 and the hook plate 43.

Figure 4:
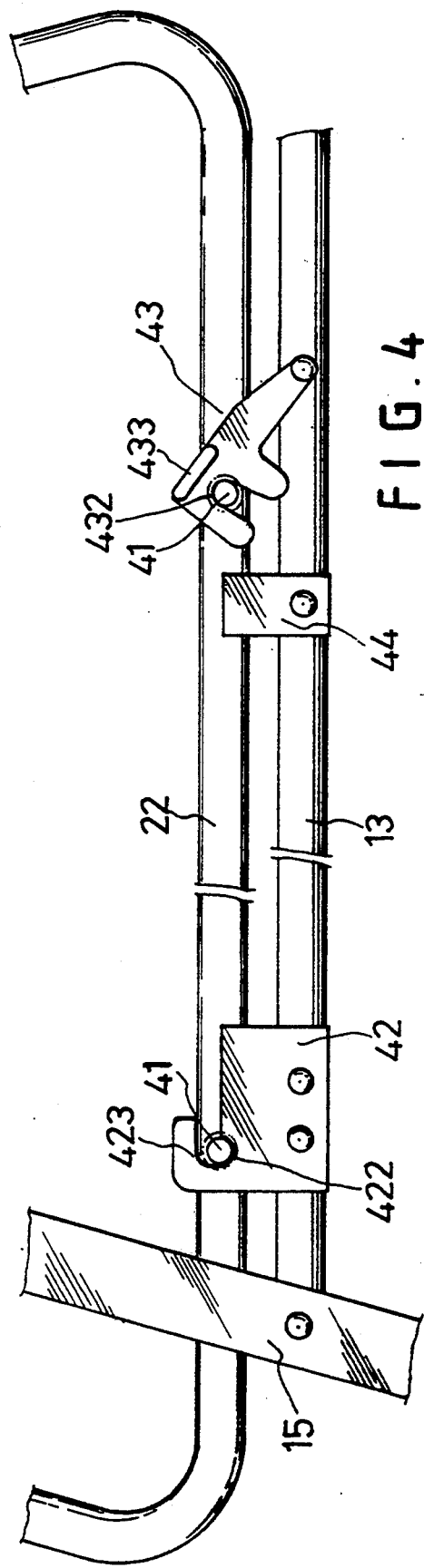
FIG. 4 is a side view of the front seat moved to have engaged the seat locating rod in the double stroller in the present invention.

FIG. 4 shows the front seat 2 has been locked in place after the front seat is moved forth, forcing one of the engaging posts 41, 41 to engage with the notch 422 of the locating block 42 and the hook plate 43 swung manually forward by gripping the projection 433 to let the notch 432 engage the other of the two engaging posts 41, 41. Then the support frame 22 is held immovable at the position. Provided that the front seat is to be turned forward for 180°, the reverse process of the above mentioned can attain the object, i.e. disengage the notches 432 and 422 from the engaging posts 41, 41 and then turn around the front seat 2 180° and then lock it again.

Figure 5:
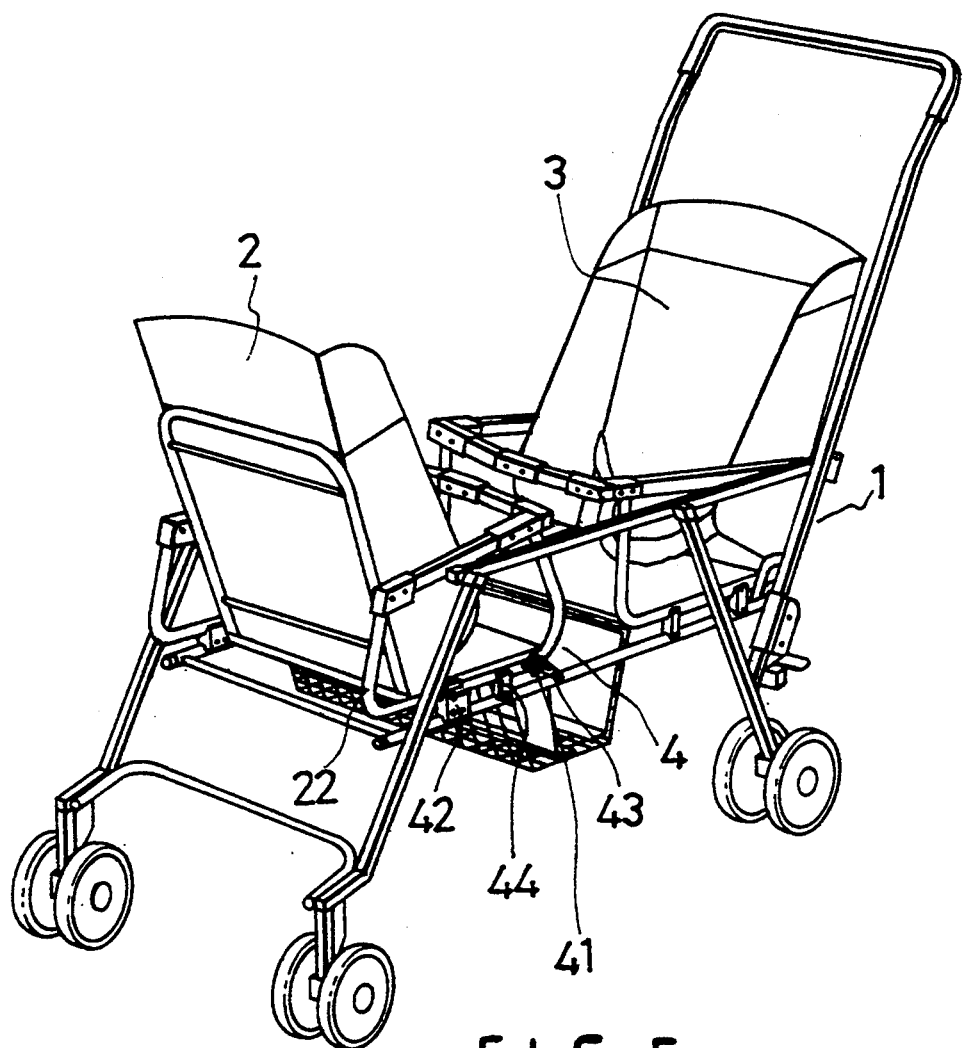
FIG. 5 is a perspective view of the double stroller with the front seat turned around to face the rear seat in the present invention; and, FIG. 6 is a perspective view of a conventional double stroller.
Figure 6:
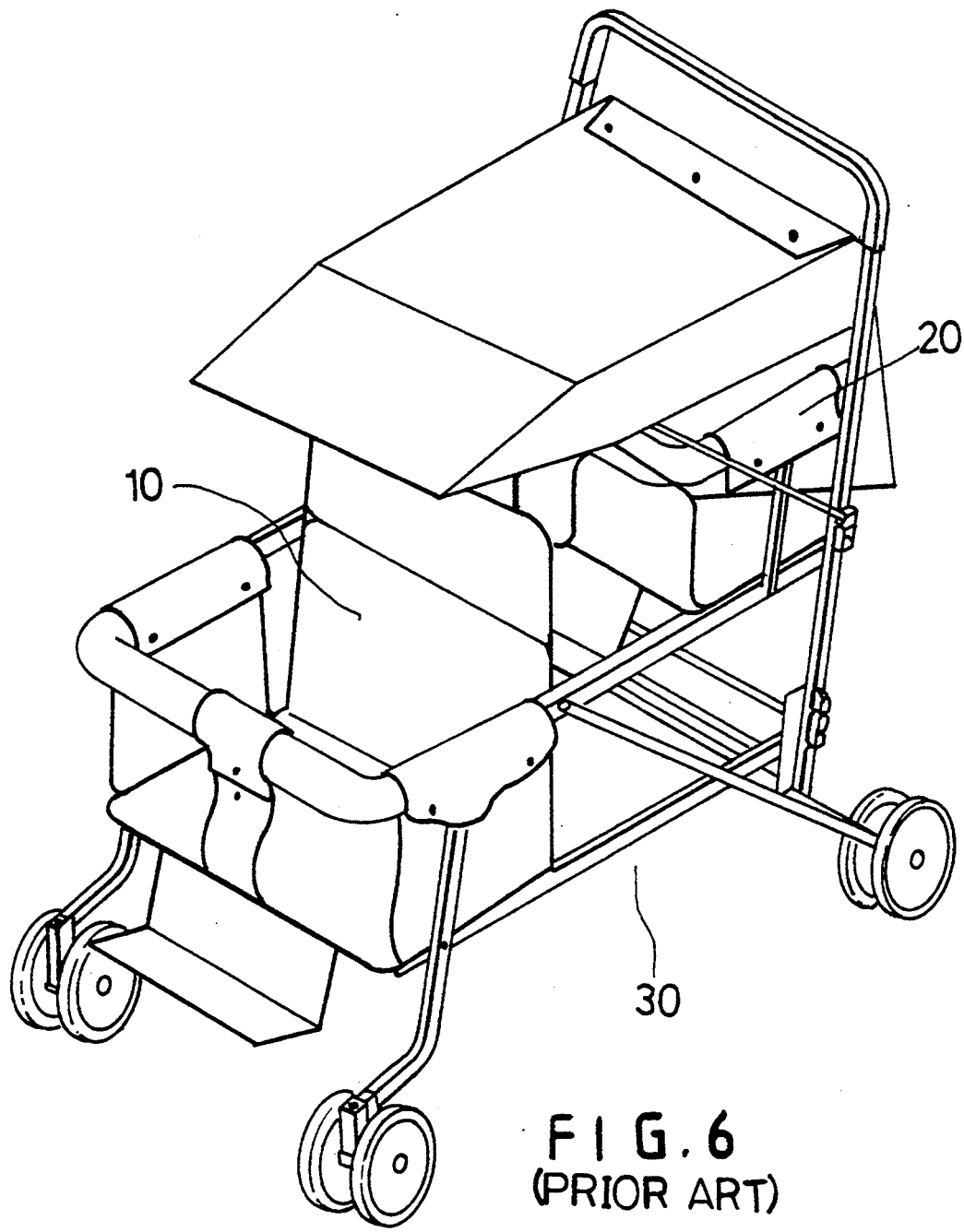

FIG. 5 shows the front seat 2 turned around for 180 and positioned to face the rear seat, and kept immovable by means of the locking device 4, enabling two babies to face each other for playing together.

While the preferred embodiments of the invention have been described above, it will be recognized and understood that various modifications may be made therein and the appended claims are intended to cover all such modifications which may fall within the spirit and scope of the invention.

What is claimed is:

1. A locking device for a front seat of a double stroller comprising:

a pair of longitudinally oriented seat locating rods, said pair of seat locating rods extending between a front portion and a rear portion of a main frame of said double stroller in fixed parallel relationship;

said seat locating rods being tubular in structure;

each of said pair of seat locating rods having attached thereto a front seat locating block, a front seat sustaining block, and a front seat hook plate;

said hook plates, being pivotally attached to said pair of seat locating rods, such that said hook plates swivel in a plane adjacent parallel to said seat locating rods;

said front seat locating blocks, sustaining blocks, and hook plates arranged fore and aft on said pair of seat locating rods to receive a front seat support frame in either a forward facing or rear facing orientation;

said front seat support frame having mounted therein four engaging posts arranged in a manner that each of said engaging posts is received by one of said two front seat locating blocks and one of said two front seat hook plates when said front seat support frame is in either of said front facing or said rear facing orientation; and, said four engaging posts spaced apart each from the other and extending from said front seat support frame for engaging and locking said front seat support frame to said pair of locating rods in either of the said forward facing or rear facing orientations;

said locating blocks being substantially H-shaped, having a semi-circular upper surface to receive said front seat support frame and having notches formed therein to receive said engaging posts;

each of said hook plates having a notch to engage one of said engaging posts and a flat bent projection for manually moving said hook plates;

said sustaining blocks being substantially H-shaped, and having a semi-circular recessed upper surface; to receive said front seat support frame.

* * * * *